Aug. 4, 1959  R. TOCHON  2,898,450
ROTATABLE VEHICLE HEADLIGHT ASSEMBLY
Filed Jan. 4, 1956  3 Sheets-Sheet 1
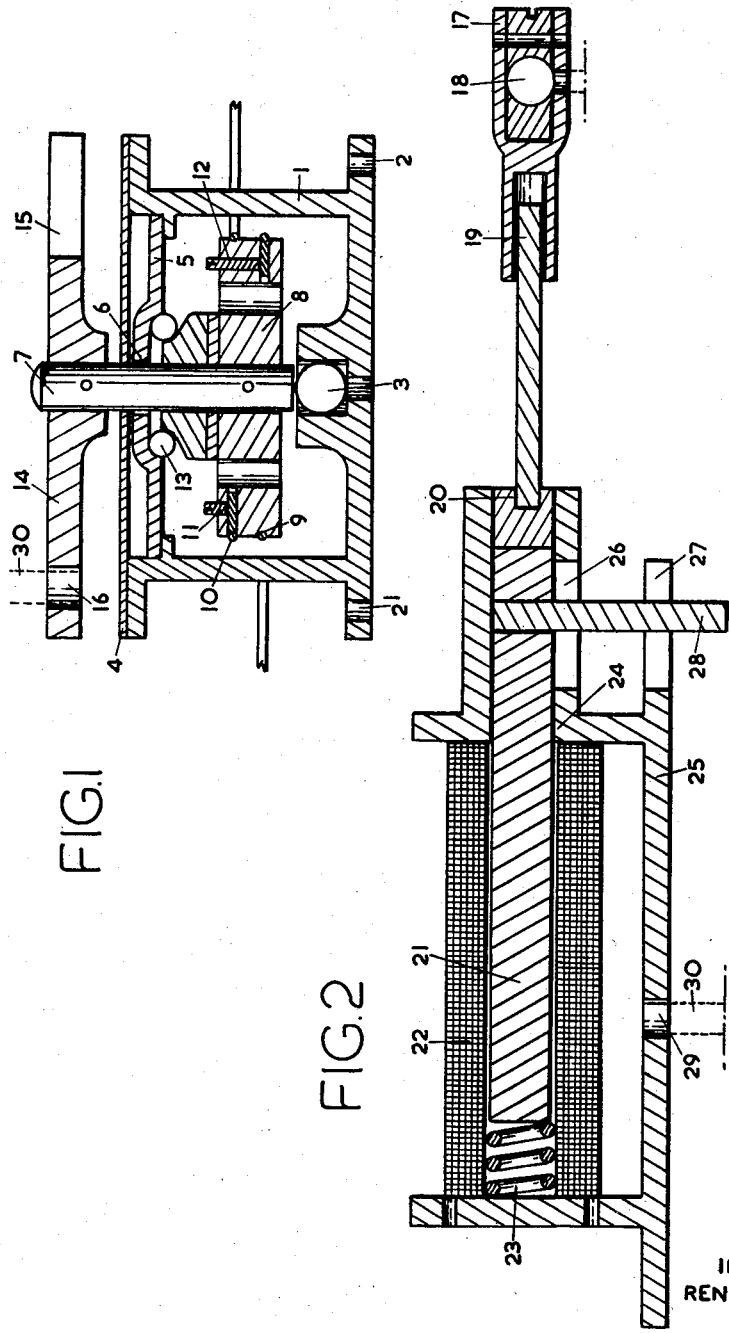
INVENTOR
RENÉ TOCHON
BY *Chatwin & Company*
ATTORNEYS

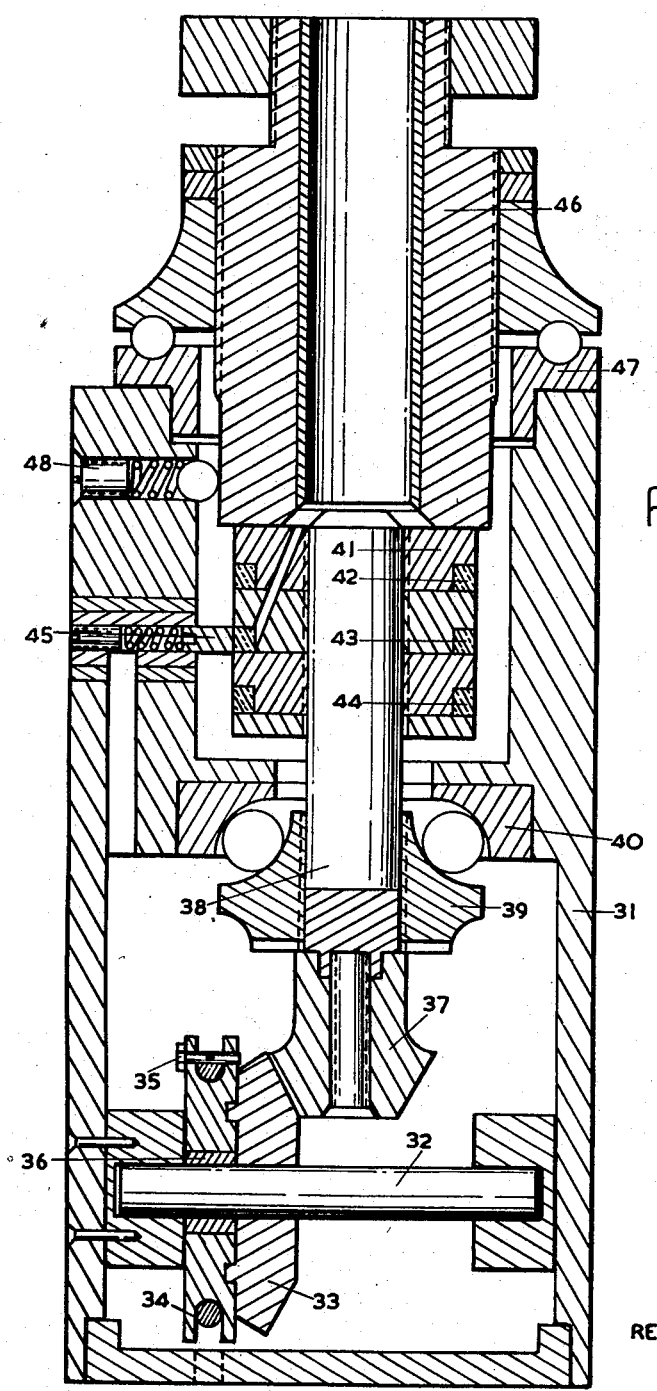

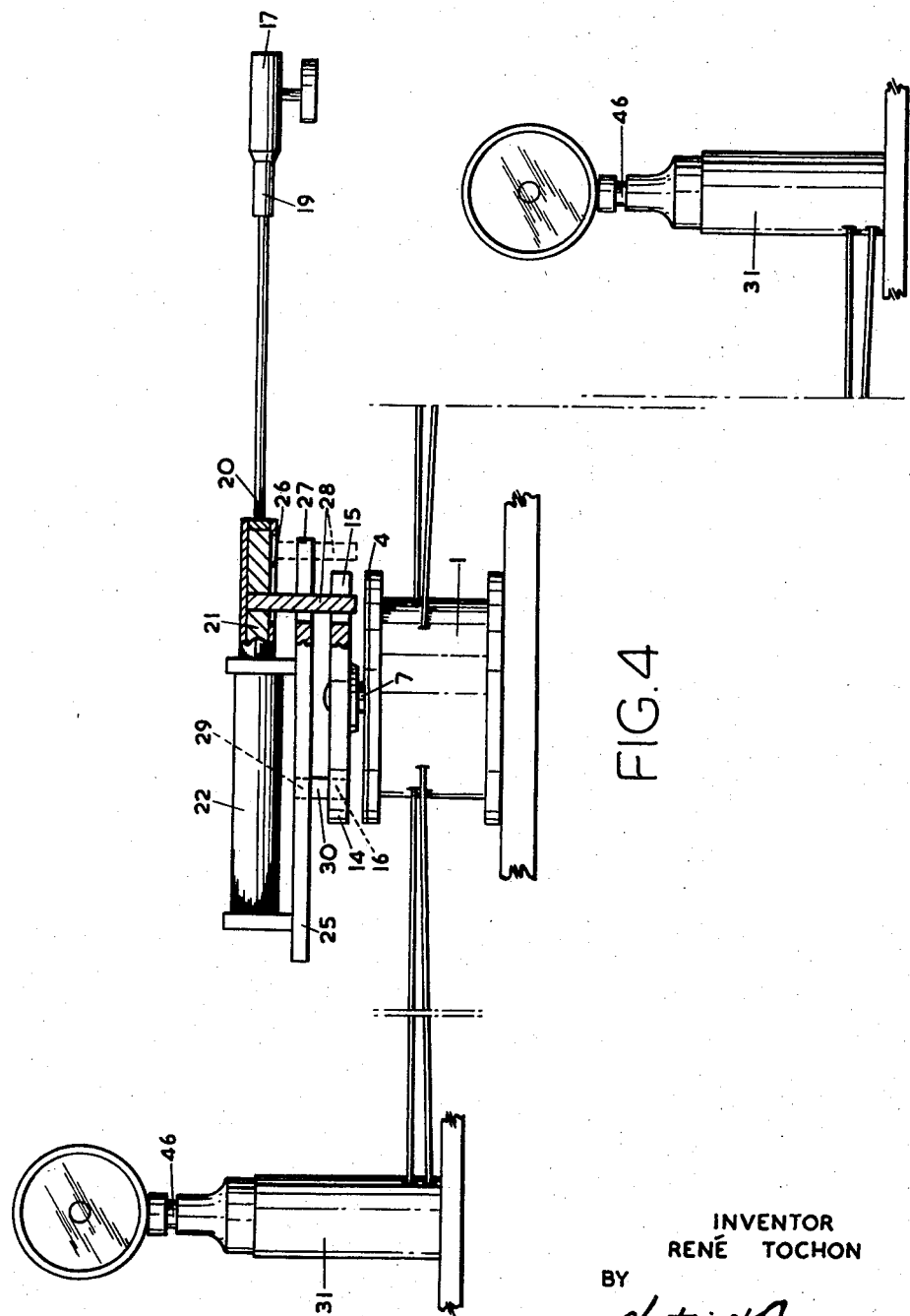

2,898,450
ROTATABLE VEHICLE HEADLIGHT ASSEMBLY

René Tochon, Gard, France

Application January 4, 1956, Serial No. 557,403

3 Claims. (Cl. 240—61.4)

The object of the invention is to provide a construction of control apparatus for causing pivoting of vehicle head-lamps in response to movements of the steering mechanism. This movement permits the illumination of the road in advance of the path of the vehicle during turning motions, as well as during linear motion.

An embodiment of the invention is hereinafter particularly described, by way of example, with reference to the accompanying drawings, wherein:

Fig. 1 is a vertical central section of part of a clutch device.

Fig. 2 is a vertical central section of another part of the clutch device, showing a connection to part of the steering mechanism of a vehicle.

Fig. 3 shows in central vertical section a lamp mounting.

Fig. 4 is an assembly view, in elevation, of the clutch means connected by cables to the two lamp mountings.

The clutch means of Fig. 1 are mounted on a fixed part of the chassis and are constituted by a cast metal frame 1 with fixing bolt holes 2, 2'. At its lower part is a ball 3 serving as a bottom bearing for a spindle 7. A cover plate 4 is secured at the top. An upper wall 5 has a circular hole 6 forming an upper bearing for the spindle 7.

This spindle carries keyed thereon a pulley 8 having two cable grooves 9, 10 each having an associated bore 11 to receive the cable end, and another threaded bore 12 to receive a grub screw for securing the cable end in the bore 11. A ball race 13 is disposed between the pulley and the upper wall 5. On the projecting upper end of the spindle 7 is keyed a disk 14 having an aperture 16 and a diametrically opposite radial open-ended slot 15.

The other clutch part, shown in Fig. 2, is constituted by a tubular housing 17 receiving a ball-headed lug 18 on part of the steering mechanism of the vehicle, e.g. the usual track rod. In one end of the housing 17 is freely slidable a coupling rod 19 secured at its other end in a block 20 mounted on one end of a core 21 of soft iron for an electro-magnet winding 22. A compression spring 23 is disposed between one end of the core 21 of soft iron for an electromagnet winding 22. A compression spring 23 is disposed between one end of the core 21 and the adjacent end of a housing 24 for the electromagnet. The base 25 of the housing 24 has parallel slots 26 and 27 in which can move a finger 28 mounted in and depending from the core 21. The base 25 has an aperture 29 in which is secured a pivot pin 30 depending below the base.

The lamp mounting of Fig. 3, is constituted by a casing 31 adapted to be secured on the chassis of the vehicle. The lower part of the casing has bearings for a horizontal freely rotatable shaft 32 on which is keyed a bevel pinion 33 fast to a cable pulley having a cable channel 34 and a cable securing bolt 35. A compression spring 36 is disposed in a recess within the pulley and acts between one bearing and the pinion 33 to keep the latter meshed with another bevel pinion 37 mounted at the bottom end of a vertical shaft 38. A lower bearing for the shaft 38 is constituted by ball bearings disposed between a cone 39 and a cup 40 mounted in the casing.

Disks 41 of insulating material, mounted on the shaft 38 carry brush rings 42, 43, 44 to receive current for lighting a head-lamp from spring loaded carbon brushes 45 radially slidable in the side wall of the casing 31. On the upper part of the shaft 38 is secured a mounting member 46 supporting a head-lamp (not illustrated). The member 46 carries one half of a ball race, and ball bearings are disposed between the latter and another half race 47 secured on the top end of the casing 31. A spring loaded ball catch 48, of adjustable tension, serves to locate the member 46 in dead-ahead position of the head-lamp, by seating on a flat on the member 46.

The operation of the apparatus is as follows:

The clutch part, Fig. 1, is secured on a fixed part of the chassis by fixing bolts passing into the holes 2, 2'. The other clutch part of Fig. 2 is then seated with its base 25 resting on the disk 14, and with the pivot pin 30 engaged in the aperture 16 of the disk 14.

In the condition of the clutch parts in Fig. 2, it is assumed that the electromagnet 22 has been energised, causing the core 21 to be drawn in to the left against the spring 23. In this position the finger 28 will have been moved into the slot 15 of the disk 14.

When the driver desires to operate the apparatus, that is to say, to cause the head-lamps to pivot, in response to movements of the steering mechanism, he energizes the electro-magnet 22 which attracts the core 21 in the manner described, and the finger 28 plus the pivot pin 30 together couple the housing 24 and disk 14 for rotary movements. On the other hand, when the electromagnet 22 is de-energized, the spring 23 pushes the core to the right, causing the finger 28 to be moved out of the slot 15, so that the casing 24 is no longer coupled, for rotation, to the disk 14. It will be appreciated that movements of the lug 18, in response to movements of the steering mechanism, take place to-and-fro at a right-angle to the plane of the drawing. The longitudinal movement of the coupling rod 19, for clutching and de-clutching, is accommodated by sliding within the housing 17.

The movements of rotation of the disk 14 and of the shaft 7 are followed by the pulley 8 and transmitted to each of two endless cables, one of which is passed round and secured to the cable pulley of each of two lamp mountings, as in Fig. 3. Thus each movement of rotation of the driving pulley 8 is transmitted to the two head lamps.

The provision of the brush rings 42, 43, 44 and brushes 45 avoids twisting of electric supply leads.

When the driver desires to un-clutch the turning means, he cuts the current feed circuit to the electro-magnet 22, whereafter the spring 23 pushes the core 21 to the right and the finger 28 moves out of the slot 15. The clutch devices are no longer coupled for rotation, and the head lamps do not move in response to steering movements.

I claim:

1. A pivotable head-lamp assembly, for automobiles of the kind having steerable wheels controlled by a steering linkage, comprising rotatable lamp mountings carried on the vehicle, a cable pulley coupled to each rotatable mounting, a control pulley rotatably mounted on the vehicle, cable means coupling said control pulley with each of the mounting pulleys, a disk secured to the control pulley and having a radial slot opening at its circumference and an aperture at a diametrically opposite position, a housing seated on the disk, a clutch spindle mounted on the housing and engaged rotatably in the disk aperture, a clutch member slidably mounted in the housing and having a finger which in one end position of the clutch member engages in the radial slot of the disk and in the other end position of the clutch member is positioned externally of the circumference of the disk, a solenoid in the housing having its core coupled to the clutch member, a return spring in the housing acting between the housing and the clutch member to urge the latter into the position in which the finger is externally of the disk circumference, and a coupling between the clutch member and steering linkage of the vehicle.

2. A pivotable head-lamp assembly, as claimed in claim 1, wherein each lamp mounting includes a bearing element secured on the vehicle, a lamp supporting spindle journalled in the bearing element for rotation about a vertical axis, a rotor of insulating material mounted on the spindle, brush rings secured at the periphery of said rotor and connected by wiring to the lamp, and spring-loaded contact brushes slidably mounted in the bearing element and contacting said brush rings.

3. A pivotable head-lamp assembly, as claimed in claim 2, wherein the lamp-supporting spindle has a keying depression in its circumferential surface and the bearing element has a radial bore opposite the spindle, and comprising a stop in said bore, a ball carried movably in the bore, and a compression spring acting between the stop and ball to urge the ball into engagement with the keying depression, thereby to tend to retain the spindle in a predetermined position of rotation with respect to the bearing element.

References Cited in the file of this patent

UNITED STATES PATENTS

| | | |
|---|---|---|
| 1,324,655 | Filippis | Dec. 9, 1919 |
| 1,392,488 | Fletcher | Oct. 4, 1921 |
| 1,498,692 | Kline | June 24, 1924 |
| 1,579,541 | Kapraun | Apr. 6, 1926 |
| 1,710,810 | De Letto et al. | Apr. 30, 1929 |
| 2,753,438 | Cialoni | July 3, 1956 |

FOREIGN PATENTS

| | | |
|---|---|---|
| 601,113 | France | Nov. 23, 1925 |
| 48,983 | Norway | Feb. 9, 1931 |
| 715,216 | France | Sept. 21, 1931 |
| 463,361 | Italy | Apr. 30, 1951 |